United States Patent
Skjoldhammer

(10) Patent No.: US 11,085,414 B2
(45) Date of Patent: Aug. 10, 2021

(54) FLOATING PLATFORM

(71) Applicant: NOVIGE AB, Västerås (SE)

(72) Inventor: Jan Skjoldhammer, Stocksund (SE)

(73) Assignee: NOVIGE AB, Västerås (SE)

( * ) Notice: Subject to any disclaimer, the term of this patent is extended or adjusted under 35 U.S.C. 154(b) by 0 days.

(21) Appl. No.: 16/131,067

(22) Filed: Sep. 14, 2018

(65) Prior Publication Data

US 2019/0145372 A1    May 16, 2019

Related U.S. Application Data

(63) Continuation of application No. PCT/SE2017/050253, filed on Mar. 15, 2017.

(30) Foreign Application Priority Data

Mar. 16, 2016   (SE) .................... 1650352-6

(51) Int. Cl.

| | | |
|---|---|---|
| *E02B 9/08* | (2006.01) | |
| *F03B 13/14* | (2006.01) | |
| *F03B 17/06* | (2006.01) | |
| *B63B 21/50* | (2006.01) | |
| *B63B 22/18* | (2006.01) | |
| *B63B 35/00* | (2020.01) | |
| *F03B 13/18* | (2006.01) | |
| *B63B 35/44* | (2006.01) | |

(52) U.S. Cl.
CPC ............ *F03B 13/145* (2013.01); *B63B 21/50* (2013.01); *B63B 22/18* (2013.01); *B63B 35/00* (2013.01); *E02B 9/08* (2013.01); *F03B 13/14* (2013.01); *F03B 13/18* (2013.01); *F03B 17/06* (2013.01); *B63B 2035/4466* (2013.01); *F05B 2240/93* (2013.01); *F05B 2280/6003* (2013.01); *Y02E 10/20* (2013.01); *Y02E 10/30* (2013.01)

(58) Field of Classification Search
CPC . E02B 9/08; Y02E 10/38; B63B 22/18; F03B 13/14
USPC ............... 405/76; 114/266, 267, 355–358
See application file for complete search history.

(56) References Cited

U.S. PATENT DOCUMENTS

| | | |
|---|---|---|
| 2,945,468 A | 7/1960 | Payne |
| 3,721,058 A | 3/1973 | Dewey et al. |
| 4,119,750 A * | 10/1978 | Porter ...................... B32B 3/28 |
| | | 428/105 |

(Continued)

FOREIGN PATENT DOCUMENTS

| | | | |
|---|---|---|---|
| CA | 2849315 A1 | 4/2013 | |
| DE | 19504356 A1 * | 8/1996 | ............ F03B 13/147 |

(Continued)

*Primary Examiner* — Frederick L Lagman
(74) *Attorney, Agent, or Firm* — Gabriela B. Tomescu, Esq.; Bergenstråhle & Partners AB

(57) ABSTRACT

A floating platform for a wave energy converter (WEC), comprising a hollow body, in which energy converting machinery may be positioned, characterised in that the floating platform has an underside facing the water in use, an upper side facing the opposite direction and a first long-side forming a front and a second long-side forming a back, and two short-sides, wherein at least one aligning means is provided, the aligning means is configured to align the front of the floating platform with the wave front, i.e. perpendicular to the direction of the wave, wherein the front of the floating platform is at least 20 m long.

17 Claims, 10 Drawing Sheets

(56) References Cited

U.S. PATENT DOCUMENTS

Figure 1A:
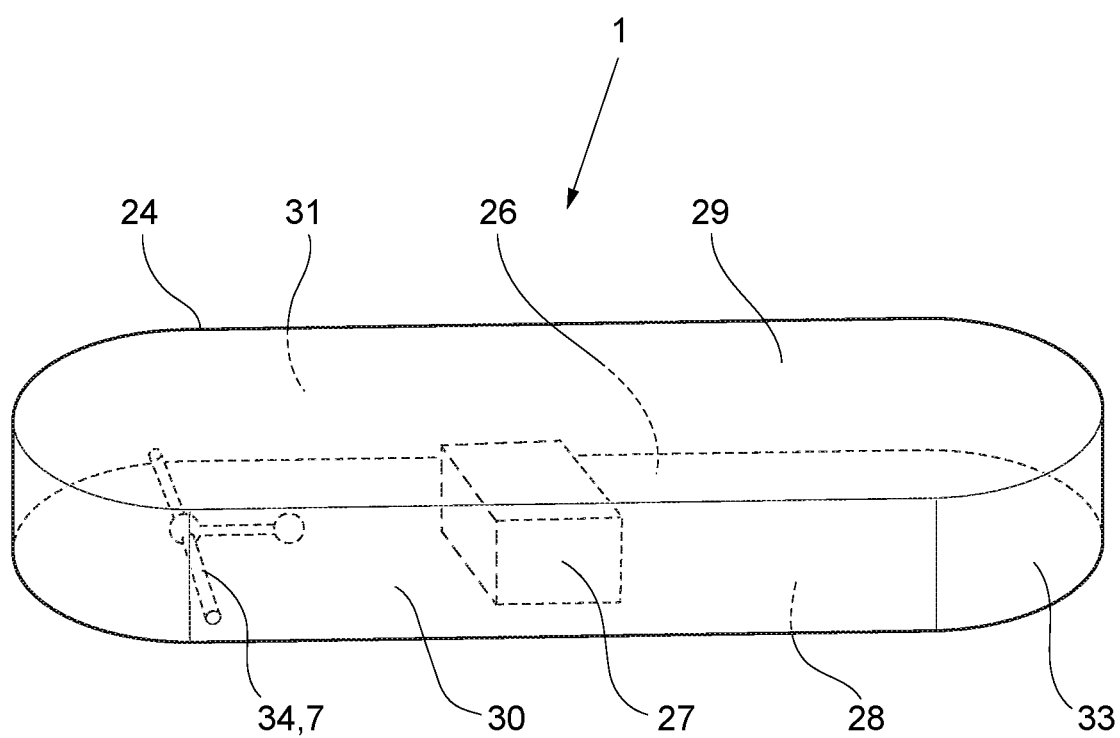

| | | | | |
|---|---|---|---|---|
| 4,123,185 | A * | 10/1978 | Hagen | E02B 3/062 405/76 |
| 4,462,211 | A * | 7/1984 | Linderfelt | F03B 13/183 60/501 |
| 4,498,412 | A * | 2/1985 | Liden | B63B 35/4413 114/264 |
| 4,689,257 | A * | 8/1987 | Baum | B32B 21/13 108/161 |
| 4,781,023 | A * | 11/1988 | Gordon | F03B 13/20 60/506 |
| 4,993,348 | A * | 2/1991 | Wald | B63B 1/107 114/265 |
| 5,136,173 | A | 8/1992 | Rynne | |
| 6,196,151 | B1 * | 3/2001 | Grant | B63B 27/143 114/261 |
| 7,101,118 | B2 * | 9/2006 | Brinkel | B63B 1/121 114/264 |
| 8,193,651 | B2 * | 6/2012 | Lightfoot | F03B 13/20 290/42 |
| 8,523,483 | B2 * | 9/2013 | Nedwed | E02B 3/00 114/121 |
| 8,564,152 | B1 * | 10/2013 | Costas | F03B 13/22 290/42 |
| 9,068,553 | B2 * | 6/2015 | McGrath | F03B 13/20 |
| 9,764,804 | B1 * | 9/2017 | Kennamer, Sr. | B63B 35/44 |
| 2005/0252764 | A1 * | 11/2005 | Meller | B63B 35/44 204/242 |
| 2007/0164568 | A1 | 7/2007 | Greenspan et al. | |
| 2008/0050993 | A1 * | 2/2008 | Mackie | F03B 13/26 441/1 |
| 2008/0093859 | A1 * | 4/2008 | Catlin | F03B 13/264 290/54 |
| 2008/0223278 | A1 | 9/2008 | Donna et al. | |
| 2009/0127861 | A1 * | 5/2009 | Sankrithi | F03B 13/264 290/54 |
| 2009/0189396 | A1 * | 7/2009 | Terao | B60L 8/00 290/55 |
| 2010/0126401 | A1 | 5/2010 | Kokkinis | |
| 2010/0320759 | A1 * | 12/2010 | Lightfoot | F03B 13/20 290/42 |
| 2011/0089689 | A1 * | 4/2011 | Gregory | F03B 13/20 290/42 |
| 2011/0131970 | A1 * | 6/2011 | Johnston | H02K 7/1853 60/497 |
| 2011/0174206 | A1 * | 7/2011 | Kupersmith | B63B 35/44 114/125 |
| 2011/0241346 | A1 | 10/2011 | Mayoral | |
| 2012/0247809 | A1 | 10/2012 | Stewart et al. | |
| 2013/0008164 | A1 * | 1/2013 | Cunningham | F03B 13/20 60/641.8 |
| 2013/0127168 | A1 | 5/2013 | Dragic | |
| 2013/0200626 | A1 | 8/2013 | Sidenmark et al. | |
| 2013/0221672 | A1 * | 8/2013 | Costas | F03B 13/22 290/53 |
| 2013/0313832 | A1 | 11/2013 | Peckolt | |
| 2014/0322996 | A1 * | 10/2014 | Nakamura | F03B 13/16 440/8 |
| 2015/0136013 | A1 * | 5/2015 | Preisler | B63B 9/06 114/347 |

FOREIGN PATENT DOCUMENTS

| | | | |
|---|---|---|---|
| EP | 2113657 A2 | 11/2009 | |
| EP | 2128430 A1 * | 12/2009 | F03B 13/22 |
| GB | 2383978 * | 7/2003 | F03B 13/147 |
| WO | 2006101395 A1 | 9/2006 | |
| WO | 2012007983 A1 | 1/2012 | |
| WO | WO-2015116016 A1 * | 8/2015 | F03B 17/061 |
| WO | WO-2016064209 A1 * | 4/2016 | B63B 21/50 |

* cited by examiner

FLOATING PLATFORM

This application is the continuation of International Application No. PCT/SE2017/050253, filed 15 Mar. 2017, which claims the benefit of Swedish Patent Application No. SE 1650352-6, filed 16 Mar. 2016, the entire contents of which are hereby incorporated by reference.

The present invention concerns a floating platform configured to be used in a Wave Energy Converter (WEC) of the point absorber type.

BACKGROUND

The tremendous forces in sea waves as a potential for extracting electrical energy, is well known. The weight of water in relation to air is 830/1, which shows that in a much lesser area, the same or better effect as wind power can be extracted. This also applies even as the wind velocity in average is higher than the vertical wave speed of waves.

The best numbers for cost/efficiency of existing wave power systems are today about 80% higher than wind power. The wave power converters that exist give an average power per unit of less than 100 KW. This combination explains the very moderate interest among commercial investors.

Most point absorbers comprise a circular buoy, 7-14 meters in diameter, floating at the surface, connected through a wire or similar, to the ocean floor. Point absorbers of today's design are generally floating quite low in the waves as a consequence of small diameter and heavy weight. They also often have a rounded bottom. These factors are affecting the power output very negatively, as the wave flattens considerably just below the top layer, giving a much lower lift than the wave height could indicate.

SUMMARY OF THE INVENTION

The above shows disadvantages of today's point absorbers due to small size, high relative weight causing low flotation and not ideal design with V-shaped bottoms as well as circular form. The cost per MW in present configurations are consequently far too high to compete with wind power.

Thus an aim of the present invention is to provide a better and more effective point absorber.

According to the invention a floating platform (i.e. a kind of point absorber) for a wave energy converter (WEC) is provided, comprising a hollow body, in which energy converting machinery may be positioned. The floating platform has an underside facing the water in use, an upper side facing the opposite direction and a first long-side forming a front and a second long-side forming a back, and two short-sides. At least one aligning means is provided, which is configured to align the front of the floating platform with the wave front, i.e. perpendicular to the direction of the wave. The front of the floating platform is at least 30 m long. By aligning the front of the floating platform with the wave front, an enlarged lifting area may be used without being influenced by the previous and next wave. Otherwise it would decrease the lifting height due to the fact that the platform would not be able to follow the wave form. In that case the platform would not be able to follow down to the bottom of the wave and would also cut the top, thus decreasing the lifting height and therefore decreasing the power out take.

According to an embodiment of the invention the length of the front is at least 40 m, preferably at least 50 m.

The length of the front is at least two times the length of the side, preferably at least three times, and most preferred at least five times the length of the side.

The height of the floating platform is at least 1 m, preferably at least 2 m, or at least 4 m high. Preferably, the machinery for extracting power is positioned inside the floating platform and enough room for this must be provided for.

The floating platform is made up by means of a composite sandwich construction. This will provide a lightweight and stiff forming platform. Thus the floating platform will be on the water more than in the water, protruding just slightly into the water, for example 10-30 cm. This has as a consequence that the concept will behave as a non-resonant absorber, as opposed to the more common, very heavy in relation to diameter/size, resonant absorber. Our tests and calculations have shown that on of the several advantages being that it is able to react immediately upon the lifting force of the waves, not being delayed by the high inertia of the normal heavy absorbers. This is even more important when lower waves are dominant. Another aspect is that the proposed concept takes advantage of the water particles vertical movement higher in the waves, reducing the "added mass" implications relative to area, as opposed to the concepts with a larger/deeper draft. This light, high floating absorber, will also produce a higher radiation force than concepts with a large draft, relative area, again exerting more lifting power as a consequence.

The platform is configured to work in waves of deep sea shape at a sea depth of more than 1.3 times the highest probable monster wave. Monster waves are also commonly known as rogue waves or freak wave. They arise irregularly and may be as high as 2 to 4 times the average wave height. Only one in 300,000 will be four times as high but they must be accounted for.

According to an embodiment of the invention the aligning means is for example any one of or a combination of wing/s provided at least on the upper side, jet thruster/s arranged in vicinity of the underside, blades arranged in vicinity of the short sides, and/or propeller/s arranged in the vicinity of the underside. It is conceivable with other means, too.

According to a further embodiment of the invention the wing/s are arranged so that they start halfway between the front and the back and reach out backwards behind the back. Preferably, there are at least two wings, and preferably at least four wings. It is preferred that the wings are almost parallel having an angle between 0 and 8 degrees spreading out backwards.

According to an embodiment of the invention the at least two jet thrusters are configured to thrust water backwards and frontwards, respectively, in the vicinity of one short-side, preferably at an end portion of the back and the front, respectively, of the floating platform.

According to an embodiment of the invention the short-sides have at least a first portion provided in an angle greater than 90 degrees between the front and the first portion.

According to an embodiment of the invention the floating platform is anchored to the sea bottom with at least one anchoring between the bottom and the floating platform. In one embodiment, the anchoring is attached in a rotatable attachment means provided at the underside of the floating platform. In another embodiment the floating platform is anchored via fixed points at the front and the back.

According to an embodiment of the invention at least one mooring and power extraction connection is provided between the sea bottom and the floating platform. In one embodiment, the at least one power extraction connection is going through the rotatable attachment means, into the floating platform.

SHORT DESCRIPTION OF THE DRAWINGS

Figure 1B:
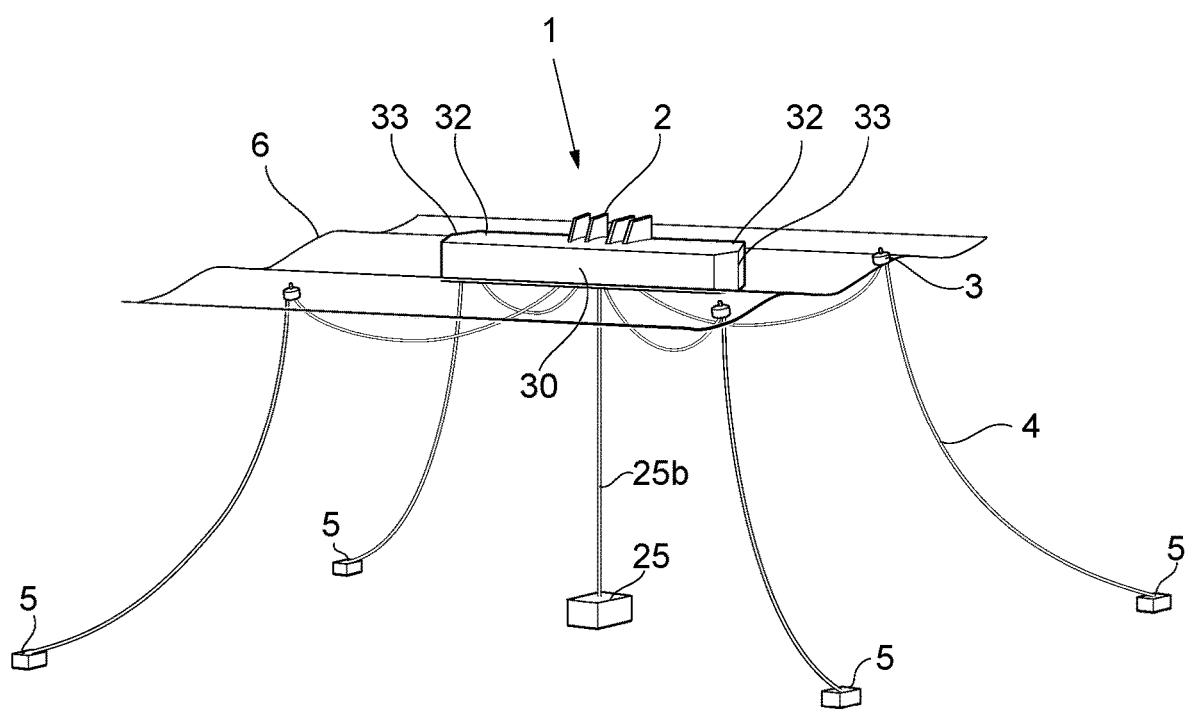
Figure 2:
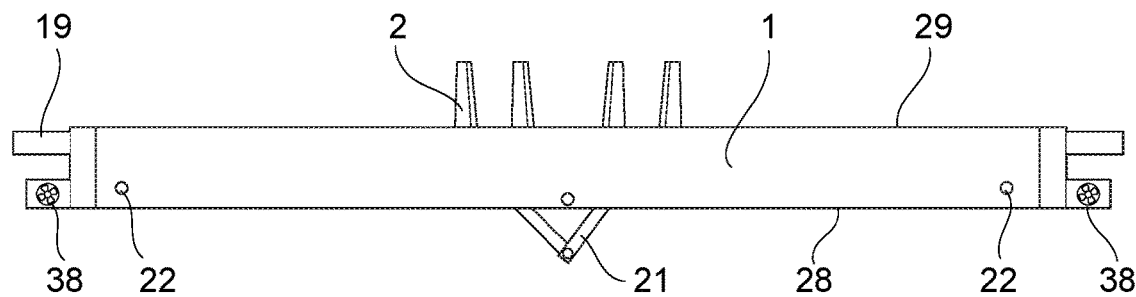
Figure 3:
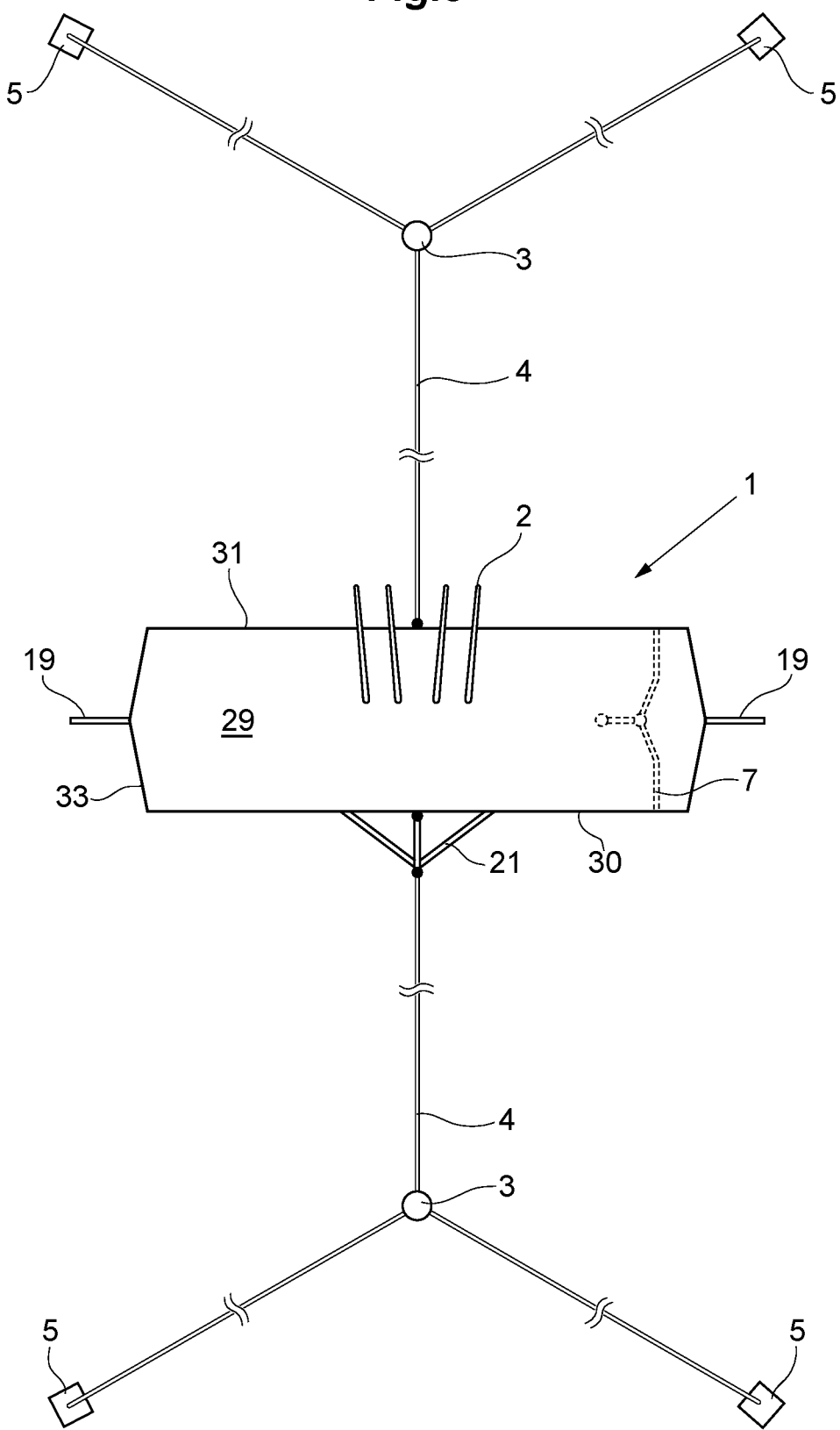
Figure 4:
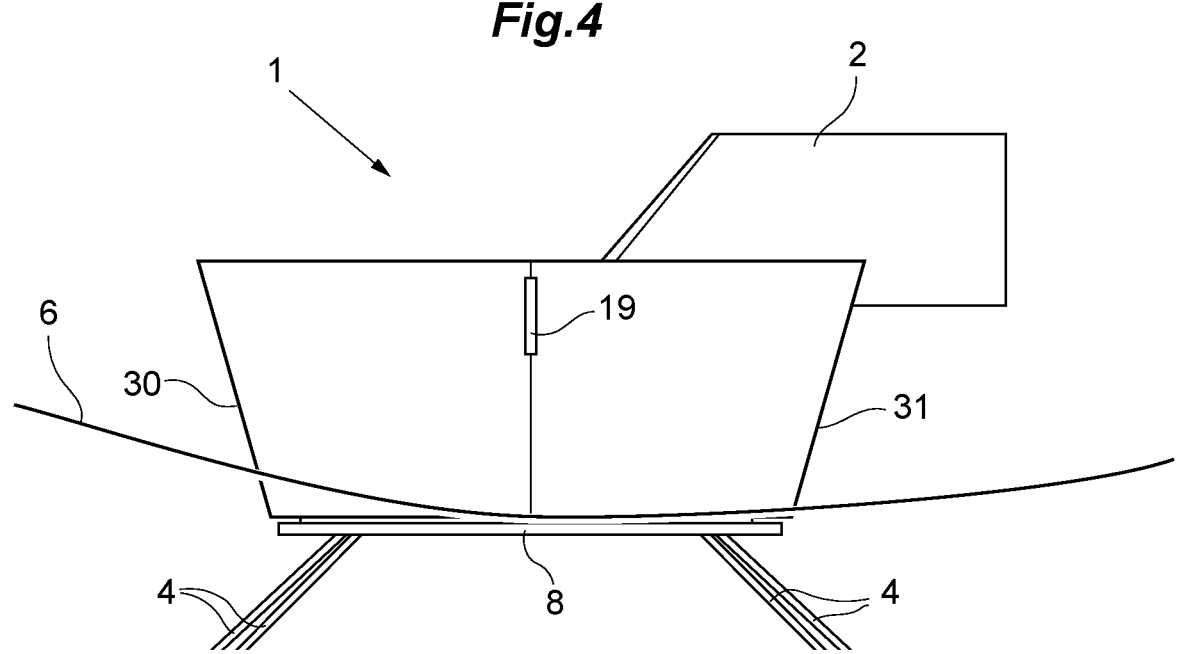
Figure 5:
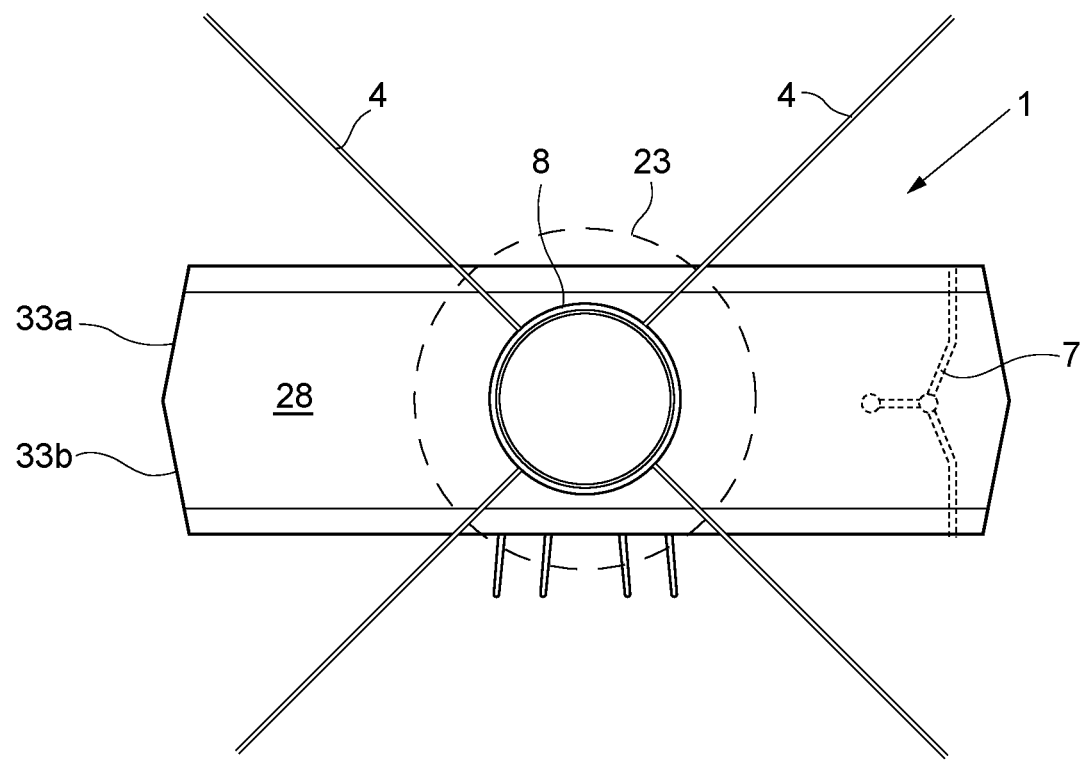
Figure 6:
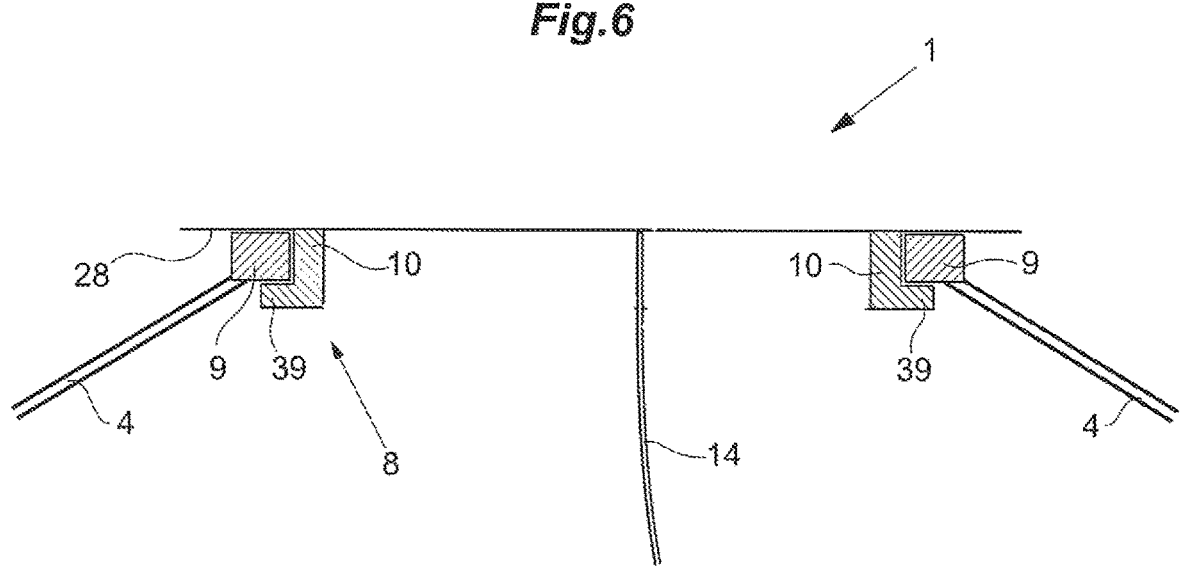
Figure 7:
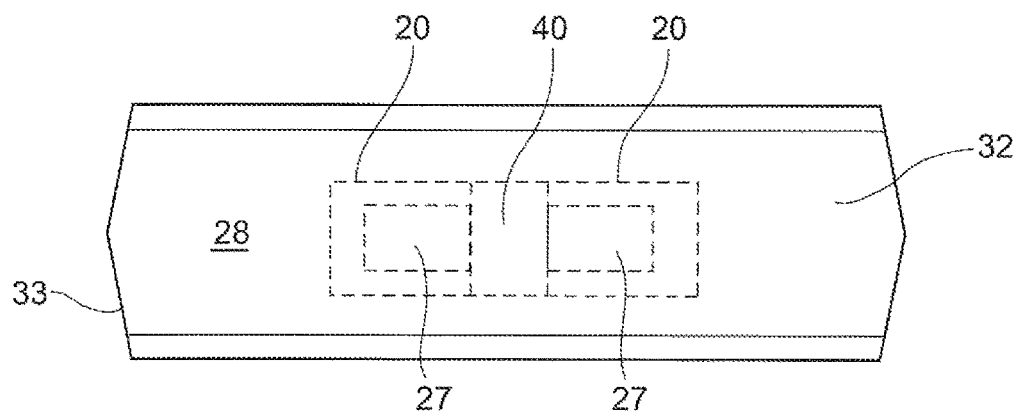
Figure 8:
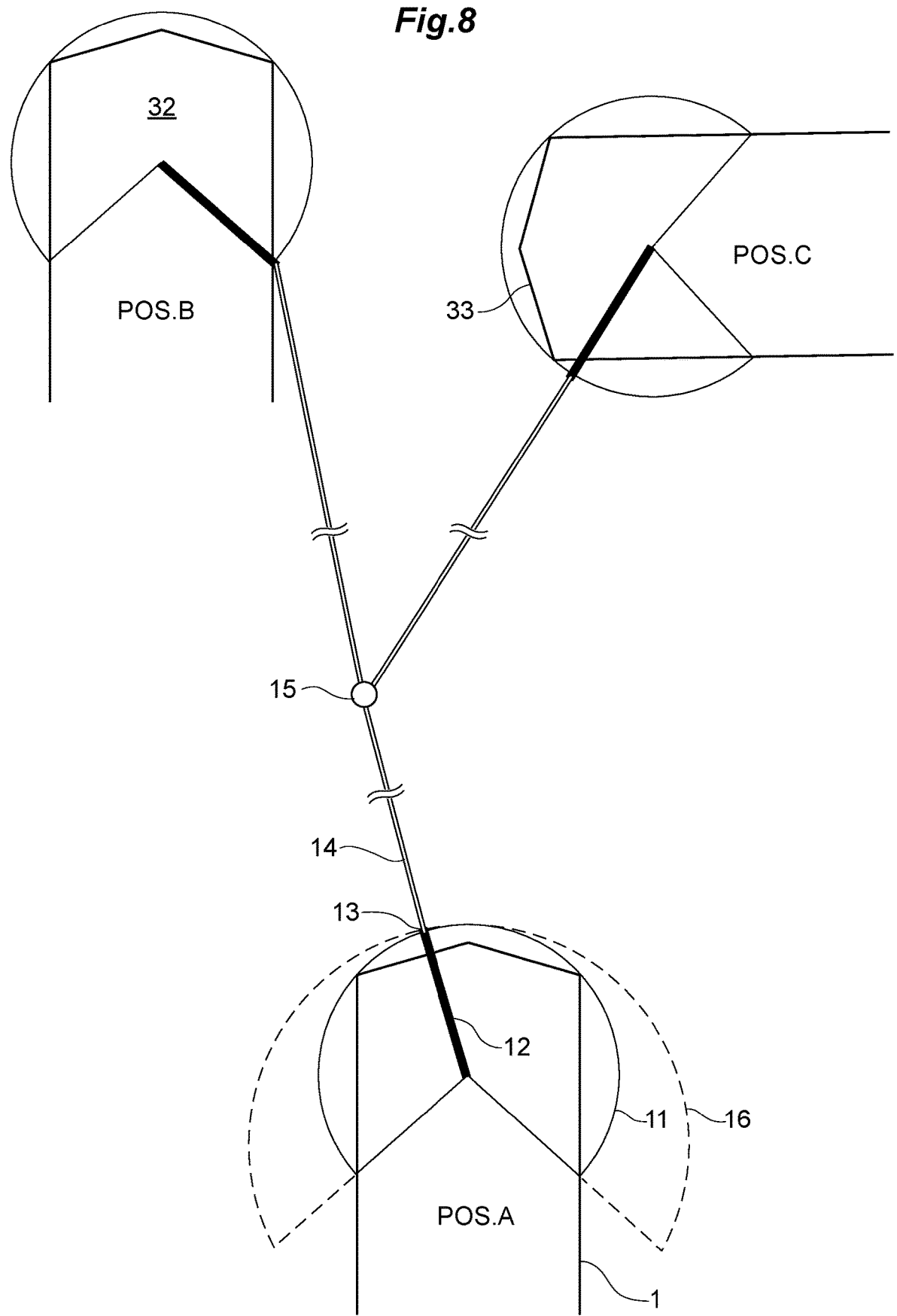
Figure 9:
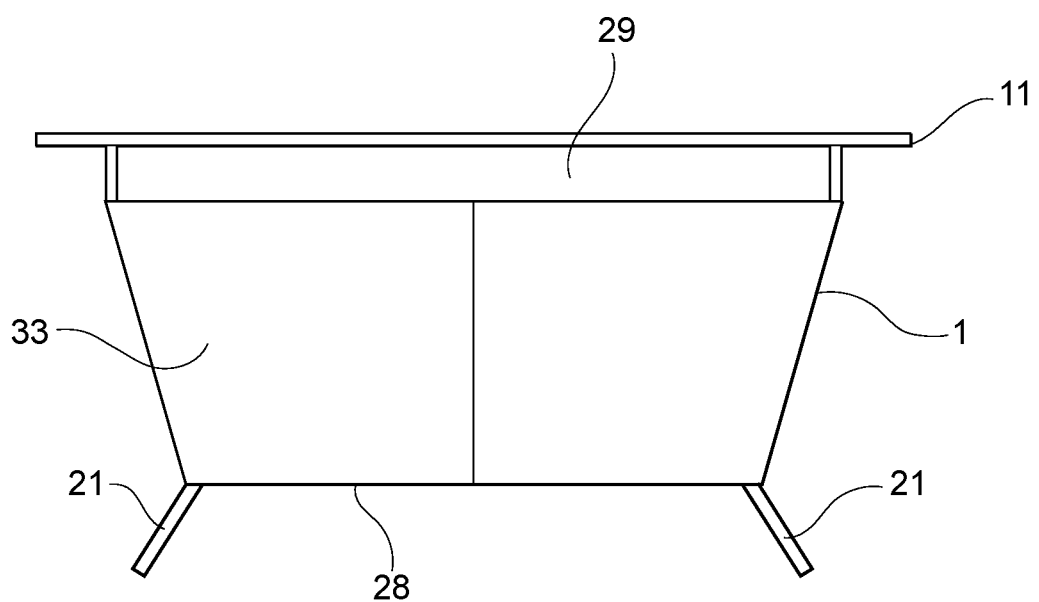
Figure 10A:
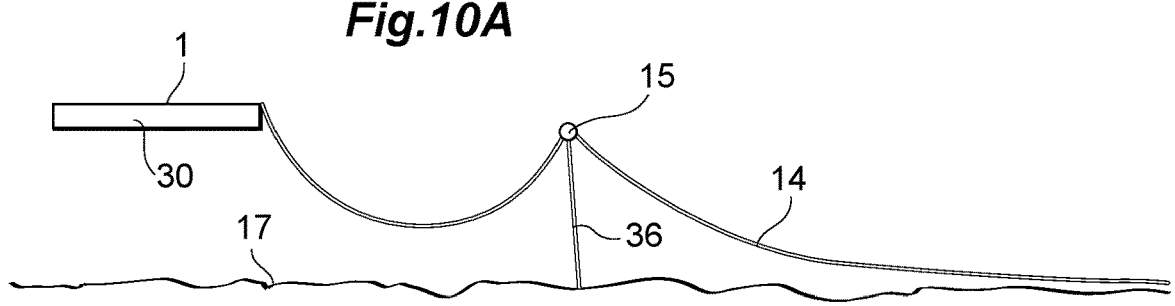
Figure 11A:
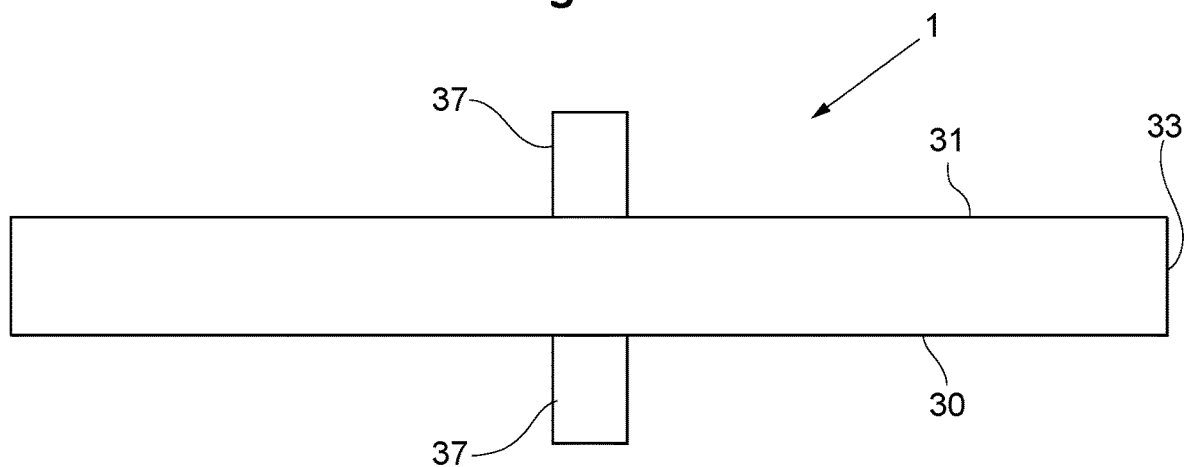
Figure 11B:
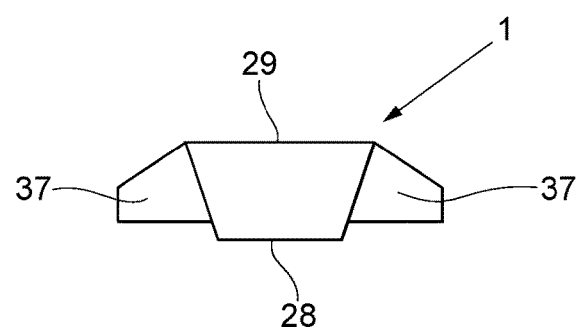
Figure 12A:
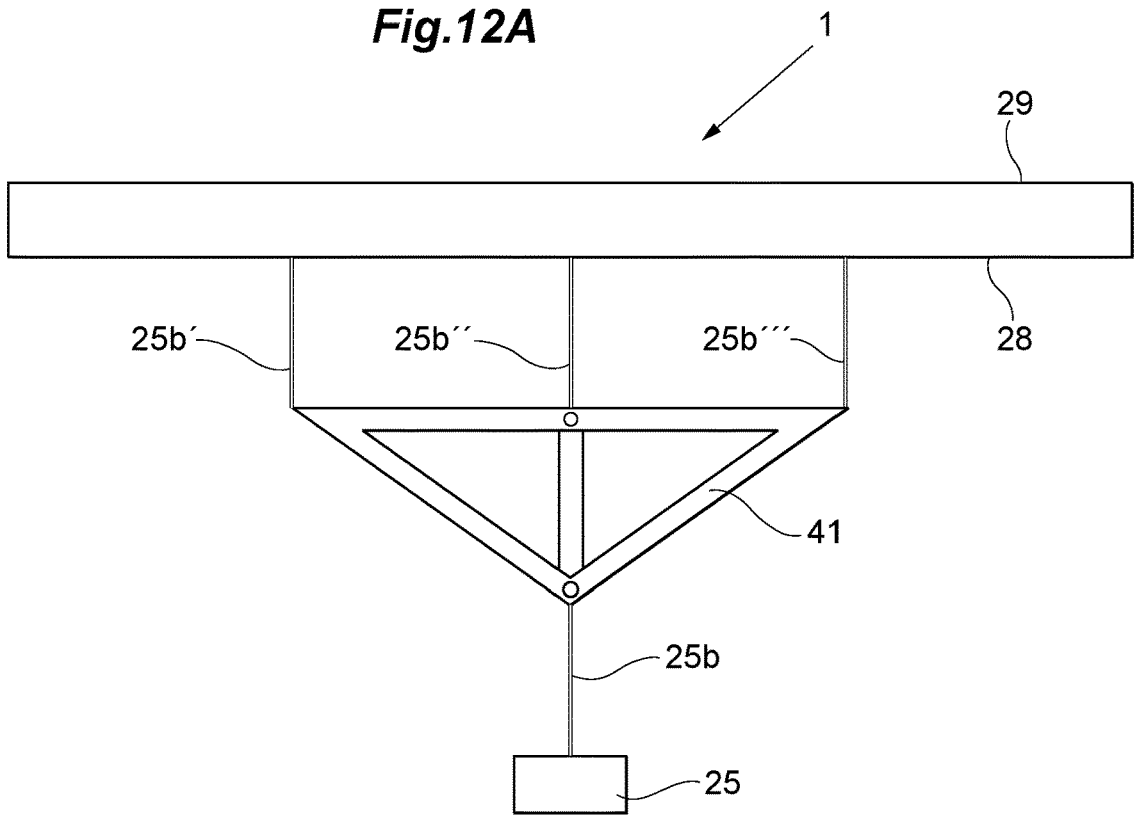

The present invention will now be described by means of different embodiments under referral to the enclosed drawings, in which:

FIG. 1a is a perspective view of an embodiment of an inventive floating platform, FIG. 1b is a perspective view of an embodiment of an inventive floating platform in waves, with an embodiment of anchoring, and one option of alignment means, FIG. 2 is a front view of an embodiment of a floating platform, FIG. 3 is a top view of an embodiment of a floating platform, with another embodiment of anchoring, and three different options of alignment means, FIG. 4 is a side view of an embodiment of a floating platform showing a short side, FIG. 5 is a view from an underside of an embodiment of a floating platform, showing an embodiment of attachment for the anchoring, FIG. 6 is a side view of the embodiment of attachment for the anchoring in FIG. 5, FIG. 7 is a plan view from below the platform, FIG. 8 is a top view showing a power cable to shore arrangement in different angles towards a power cable buoy, FIG. 9 is a side view of an embodiment of the platform with the export cable rail, and fixed anchoring points, FIGS. 10a, b, c, d is a side view, respectively, showing the power cable 14 going via buoys 15 to shore or connection hub, FIGS. 11a, b is a top and short-side view, respectively, showing outriggers, and FIGS. 12a, b are side views of a multiple machinery connection.

DETAILED DESCRIPTIONS OF THE INVENTION

All illustrations of the drawings are for the purpose of describing selected versions of the present invention and are not intended to limit the scope of the present invention.

The present invention concerns a floating platform 1 configured for extracting the energy in waves according to the point absorber principle. In FIG. 1a an embodiment of the present invention is shown. The floating platform 1 is made up as a hollow body 24. Inside, in the space 26 of the hollow body 24 energy converting machinery 27 may be positioned. For example, at least a gearbox and a generator may be positioned within the body 24. The machinery 27 can be in the platform 1, partially hanging underneath the platform 1, on the ocean floor 17 or a combination of these two.

The floating platform 1 comprises an underside 28 facing the water 6 in use, an upper side 29 facing the opposite direction and a first long-side forming a front 30 and a second long-side forming a back 31. At the ends 32 short-sides 33 are present. The shape of the short ends may be any suitable shape such as straight, concave, convex or pointy i.e. having two portions 33a, 33b which are arranged with a larger angle than 90 degrees between the front 30 and the back 31, respectively, to the respective portions 33a, 33b.

The platform 1 is provided with at least one aligning means 34. The aligning means 34 is configured to align the front 30 of the floating platform 1 with the wave front, i.e. perpendicular to the travelling direction of the wave 6.

The floating platform 1 is preferably connected to a large mooring 25 or attachment to the sea floor by other means, for instance through drilling holes in sea floor rock and cementing metal spears in these. Additionally, it may be anchored in a relative fixed position by for example two to four anchors 5 for example by means of anchor chains 4. A buoy 3 is used for each anchor 5. The purpose of the buoys is to hold the platform 1 in position without restricting the vertical movement. They will also exert a damping force on the anchoring 4, 5 of the platform 1. The anchor chains 4 must not be a chain but may be a cable, wire, chain, belt or similar.

A power extraction connection 25b to the platform 1 can be embodied by means of a near vertical direction line, cable, wire, chain, belt or similar. The present invention is able to harness marine wave forces so that the vertical wave forces can be converted into electricity through the present invention. The generated electricity of the present invention can be transported into electricity distribution centre/-s through underwater electricity cables or overhead floating electricity cables.

The inventive floating platform has a shape where the lifting area is large as a consequence of it laying parallel to the waves 6, and thus may be lengthy along the front 30 and back 31, respectively. The length of the front 30 may be at least 30 m, preferably at least 40 m, and most preferred at least 50 m.

A ratio between the length of the front 30 to the length of the short-side 33 could be 2:1 or more, irrespective of the building materials. Most Wave Energy Converters, WE s, comprise a circular buoy, 7-14 meters in diameter, floating on the surface, connecting through a wire or similar, to the ocean floor. The diameter sizes are limited so as to go w fully down in the wave through as well as not cutting the wave crest. 7 meters gives a lifting area of 42 square meters. 14 meters in diameter gives an area of 154 meters. If the inventive floating platform 1 has a width of 14 meters it may for example have a length of 51 meters, which gives a lifting area in the presented design of 714 square meters, thanks to its more or less rectangular shape. That is a 4.6 larger lifting area compared to a circular is buoy. In other words, the patent advantage is based on a wave platform lying parallel to the waves.

In areas with an average wave height of 3 meters or more, the shown ratio of 3.5:1 is sufficient to create tremendous lifting force. When more lifting force in wanted, for example in areas with lower wave heights, the ratio may be increased up to 10:1. The reason for this is that the distances between the consecutive waves decreases with lower wave heights, causing a conceivable distance from front 30 to back 31 of 14 meters to be too long. A distance of 8-10 meters will be more suitable not to cut the wave, as would have been a risk in the case with 14 meters or similar. 51×14 is 714 square meters of lift. If instead going 100×10 meters in size, the smaller waves will be compensated for by the 1000 square meters of lift, ten times more than a circular buoy. The power take-off system and machinery will then be working with a strain and output not so far from what is achieved in higher waves. This ratio may also be used in areas with higher waves/longer wave lengths, with for instance 140×14 meters, giving a lifting area of almost 2000 square meters.

With this narrow shaped platform, the system can generate immense power even in areas with average wave height about 1.5 meters, which is easily found all around the world, in addition to all the coastal areas with much higher waves. It might seem difficult to achieve the necessary strength for the floating platform 1 with this high ratios, but there are actually construction methods available today that can take care of this kind of heavy load. The inside construction could be made with ribs as well as reinforcement in relevant areas where the forces will be high. Alternatively, a more massive construction with XPS or similar as a lightweight block filling up much of the inside, is possible. The shape or technical solutions are not bound exactly to the drawings; they are only examples of possible designs within the scope of the appended claims.

The short sides 33 as shown in FIGS. 1b and 3 are slightly edge shaped having two portions 33a, 33b, which will help in both taking the sea better, but also helping to stabilize (align) towards the wind. The reason for this is that as the platform 1 turns to one side, the frontal wind pressure will be larger on the side turning towards the wind, measured from the centre of pressure on the anchoring ring. These short-sides 33, 33a, 33b are preferably vertical, to achieve maximum bottom surface.

The front 30 and back 31 long sides may have a decline inwards and downwards, i.e. the underside 28 is smaller than the upper side 29, to better stabilize in the horizontal plane. This is an option, as the platform 1 will work also with vertical sides, as well as with more declined shape. See FIG. 4 for example.

The underside 28 of the platform 1, is preferably flat, to achieve as much lifting force as possible. The top is flat in the figures, but may have different shapes depending on machinery as well as testing and animations.

If the machinery is on board, there will be a wet room in the middle of the platform 1, where the wave power will be transferred to the different components in the dry section. The wet room is preferably watertight to the upper side 29 or at least two thirds of the height depending of the height of the platform 1. The height of the platform 1 is at least 1 m, preferably at least 2 m or at least 4 m high.

The aligning means 34 is any one of or a combination of a wing/s 2 provided at least on the upper side 29, a jet thruster/s 7 arranged in vicinity of the underside 28, blades 19 arranged in vicinity of the short sides, and/or propeller/s 38 arranged in the vicinity of the underside 28. According to one embodiment a jet thruster 7 system is provided, see FIG. 3. It works by sucking up water from underneath the platform 1, pushing it through piping towards a split in the piping, where a valve decides if the water jet will go towards the front 30 or back 31, thereby rotating the platform 1 in wanted direction, so it will be parallel with the waves 6. It works in the same way as a common bow thruster on any medium sized yacht, but has the advantage of not having a propeller that can tangle into foreign objects. The whole or parts of the jet thruster 7, such as the valve and outlets, can instead be placed on the centreline just outside of the end 33 of the platform 1. The engine may be an electrical or hydraulic unit that can be powered from the energy creating systems on-board. The principle is not limited to specifically a jet thruster 7, but a regular bow prop, a propeller 38, see FIG. 2, outside of the short ends extension, and similar solutions is to turn the platform 1 either way, are options for yaw control of this invention.

The jet thruster 7, or similar systems needs an input to power the system correctly. There are some options available, but the most probable and well proved solution is accelerometers 22, see FIG. 2, placed in the port and starboard front 30, and connected to a GPS system. GPS only is cheaper but gyro in combination with GPS or alone may also be used. A quite simple logic that already exists on the market is needed, to monitor the sensors as well as to execute the commands. The accelerometers 22 senses which side of the platform 1 that rises first with the incoming wave, respectively which side descends first with the passing wave crest. If for instance the port side rises first, a command will be given both to start the jet thruster 7, as well as to the valve, to open the relevant forward or rearward blow out, to turn the platform 1 to again be aligned with the wave. Rearward or forward blow depends on which end 32 of the platform 1 the thruster 7 is placed. As an option to the accelerometers 22, lasers or sensors on the front side 30, that measures the water/wave 6 height, might be used.

Not shown on the drawings, but the electrical needs on-board the platform 1, may be tapped from the energy-producing unit on-board or from a smaller fixed position wind turbine placed on deck, combined with a battery. A crane or winch may be installed on deck as well, helping with installation and replacement of heavy parts.

In FIGS. 3 and 4 another embodiment of an aligning means 34 is shown. Wings 2 are arranged at least on top of the upper side 29. In FIG. 3 it is shown that the wings 2 are arranged so that they start halfway between the front 30 and the back 31 and reach out backwards behind the back 31. Preferably they also protrude downwards behind the back 31. The wings may be almost parallel having an angle between 0 and 8 degrees spreading out backwards. The vertical wings 2 help to position the platform 1 with the front long side 30 towards the waves. As the difference between wind and waves may be up to 45 degrees, this alone is not sufficient for the perfect alignment, but will do a major part of the job, without costing any energy. The alignment can also be done by other means, so is the wings 2 are an option, not a necessity. The wings 2 have an angle of about 5 degrees to either side, in the shown figures. The purpose of this is to get more force at an early stage of turning, so that it self stabilizes quicker. The wings 2 will also work with other angles as well as with different size, shape and numbers. Preferably they are placed to the rear of the centre of anchoring pressure, they extend rearwards to gain momentum, extend upwards and optimum a bit down on the stern side, but not so far as to meet the sea. They can be made in any material and design being able to withstand the maximum wind force.

As the wave direction seldom is exactly perpendicular to the wind direction, additional functions may be needed to position the platform 1 as aligned as possible with the wind. One simple solution that will do a major part of this job, is to make the wings turn-able plus minus about 30-40 degrees. This may be done in a similar way as with elevator trim on many aircraft. The wings are in this case mounted on a vertical swivel axis, with hydraulic or electrical screw-jacks pushing the front end of the wings to desired position. If four wings, they would all be connected with a front end spar and run by one screw-jack. Relatively low power is required due to the large momentum. The system will be slow moving.

In FIGS. 2 and 3 end blades 19 are an option for additional yaw control. The end blades 19 can be pushed in and out on either side, to increase the wind pressure on port or starboard side. This is most likely a relevant option if the wings are of the fixed not turn-able solution, and will relieve the jet thruster 7 of work when the wind in average is not at a straight angle towards the waves. Alternately they can substitute the wings, given that they are correctly sized. The blade may be arranged on gliding rails, in a narrow frame, supported by bearings. They may run in and out horizontally by cog wheels connected to electrical or hydraulic motors. Other mechanical solutions possible, the principle is the important point.

The platform 1 may be anchored in a relative fixed position by two to four anchors 5 and anchor chains 4. It can rotate 180 degrees to either side to remain effective with changing wave direction. A simpler option with fixed anchoring attachment is also available, see FIG. 3, where the rotation is limited to about 160 degrees either side, depending of the size of the power take-off system under the platform 1. Within 120 degrees is though more desirable. This option is relevant in areas where the wave direction in a majority of days fall within this specter. In FIG. 3 one chain 4 is attached directly onto the back 31 of platform 1. When this is used on both sides, the angle is limited to about 80 degrees either side, to keep the chains 4 free of the platform 1 sides 30, 31. If an extension 21 is mounted to the platform's long side 30 and/or 31, outwards and/or downwards, so that the attachment of the chain 4 comes further out, the angle can be increased up to about 160 degrees. In this embodiment of anchoring the electrical export cable 14 can simply extend through a hole in the bottom of the platform, preferably relatively near the centre, as this will keep the slack of the cable 14 relatively constant. This embodiment of anchoring is a simple and a cost effective way of anchoring, and perfect when the wave direction in that area varies+/−90 degrees or less on most months of the year. The angle to anchors 5 and tightness of the anchor chains 4, will be calculated to ensure that the movement of the platform 1 is about equal in all quadrants.

The buoys 3, should be large enough to remain floating even in extreme weather. A relatively flat shape is preferred, for instance 1:3, so as not to flex more than necessary. A size of about 10 m$^3$ is estimated but of course this depends on the weight of the chains 4 and the size of the platform 1. It will consequently need to be calculated for each embodiment. The purpose of the buoys 3 is to hold the platform 1 in position without restricting the vertical movement. They will also exert a damping force on the anchoring of the platform.

The chains 4, shall be strong enough to hold the platform 1 in position in extreme weather. 30-60 mm grade U3 will be a likely option for a 51-meter platform, depending on maximum probable wind in relevant area. The anchors 5 will be sized to hold the platform 1 in position in extreme weather. Drag anchors 5 of 2-5 tons will be a likely option, depending on maximum probable wind in relevant area, as well as the sea floor conditions.

In case the anchor chains 4 are attached to the platform 1 by the fixed embodiment, the export cable 14 will go underneath the platform and the deck will be free on the port and starboard sides. Then the end blades 19 could be protruding vertically instead of horizontally, above the upper side 29 in other words, but with similar logic.

As the wind and wave conditions differ from various areas, it will be desirable to be able to choose the anchoring embodiment. Previously a fixed embodiment has been shown in FIG. 3. Now another embodiment will be described under referral to FIGS. 4-6 and 9-10. In FIG. 4 a gliding ring mechanism 8 is shown in a horizontal view. With this embodiment of anchoring the platform can rotate 180 degrees to either side, which is desirable in areas where the wave direction differ more than 120 degrees for a number of days a year. The chains 4 are connected to an outer ring 9, which glides freely around an inner ring 10, which is fastened to the platform 1, lubricated by water, see FIG. 6. The inner ring 10 has a lip 39 protruding radially outwards from the body of the ring 10, which keeps the gliding ring 9 attached to the platform 1. The ring sizes may also be larger than the width between the front 30 and the back 31, see FIG. 5, where a dashed circle 23 shows this embodiment, if wanted for a different momentum on the chains. In FIG. 6 it also shown an embodiment where the export cable 14 goes out through the rings 9, 10. Also the mooring connection 25b, preferably a chain, depending of the power take-off solution chosen, may go through the ring mechanism 8. The platform 1 may swing up to 90, 135 or 160 degrees without the export cable 14 having a conflict with the connection to the sea floor 17.

In some areas fixed anchoring, fixed wings 2, end plates plus jet thrusters 7 might be warranted, but in others gliding ring anchoring, movable wings 2 and thrusters 7 are a more optimal embodiment, and so forth. There are many thinkable combinations and sizes. The ratio width versus length of the platform 1 is also a factor affecting which total embodiment of the platform 1 to be used. One yaw system (aligning means 34) alone may also be sufficient to align the platform 1, given the platform dimensions and location.

In FIG. 7 ballast tanks 20, the inner space 26 functioning as a machine room and wet room 40 are shown. The ballast tanks may be filled with water to the desired amount, and will influence the balance and the buoyance of the platform 1. All rooms can be of different dimensions and locations than depicted.

In FIG. 8 another embodiment of arranging the electrical export cable 14 is shown. The platform 1 is shown in three different positions relative a buoy 15 for the electrical export cable 14. In this embodiment the cable 14 is leaving the platform 1 from one of the ends 32. This embodiment is relevant when wanting to have 180 degrees, either way, rotation, as an option, 360 total. If 90-120 degrees either side is generally sufficient in the relevant area the cable 14 can instead be extended through a hole in the bottom of the platform, as it will not interfere with the anchoring chains 4, see FIG. 3. This is applicable both with the fixed anchoring solution, ref FIG. 3 as well as with the ring mechanism 8, see FIG. 6. With the fixed anchoring solution 21, the displacement of the anchor chains 4 and thereby the tightening, will be a considerably harder than with the ring option 8. Choosing the one option over the other will be a consideration between building cost as well as size of the platform 1, versus wind and wave conditions in the relevant area.

In one position, pos. A, the platform 1 has its end 32 of the platform 1 being nearest to the buoy with just 20 degrees' angle of the extended centreline. At the buoy 15 the cable 14 continues in to shore or to a connecting point for several platforms 1 or wind farms. In another position, pos. B, the platform is turned 170 degrees from the buoy 15. In a further position, pos. C, the platform is turned 50 degrees from the buoy 15.

The export cable 14 may come up from the centre of one end portion 32 of the platform 1. It may go through a stiff tube 12, which glides approximately 135 degrees on rail 11. Preferably the friction between the rail 11 and the tube 12 will be minimized by the use of rollers on the rail 11. As the tube 12 in full 135 degrees' deflection, still has some degrees left to the (seldom achieved) 180 degrees' position, a flexible hose or tube 13 is placed on the extension of tube 12. The purpose is to bend the cable 14 over a longer distance, so as not to have problem with fatigue. It is also conceivable to make the rail 11 larger, see dashed line 16, as this will extend the cable 14 even further outside of the platform 1 sides, to make 180 or slightly more degrees possible. FIG. 6 shows the platform 1 from the short end 32, with the rail 11 going across and slightly above the upper side 29.

FIGS. 7a, b, c and d shows a side view of the electrical export cable 14 going to shore, when using end solution over a rail 11.

FIG. 10a shows the front 30 of the platform 1 with the end 32 having the rail 11 nearest to a buoy 15, which purpose is to make a flexible link as the platform 1 turns in different directions. In this position the weight of the cable 14, possible with added weights, keeps the cable 14 at a slack as to not hit the sea floor 17.

Figure 10B:
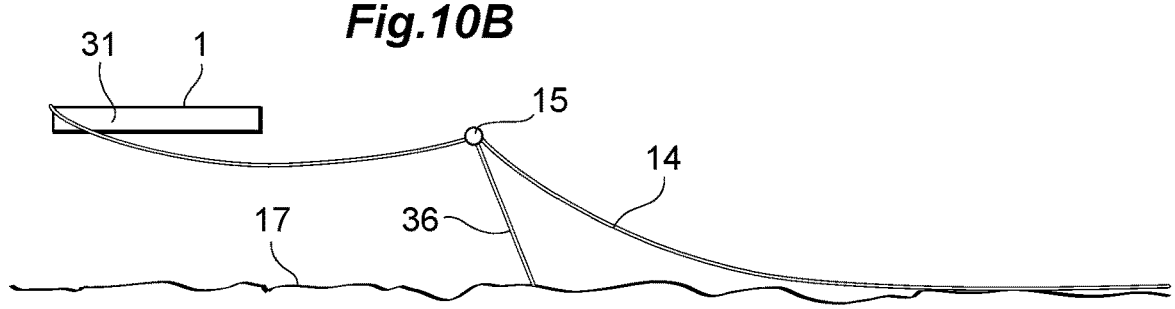

FIG. 10b shows the back 31 of the platform 1 with the end 32 having the rail 11 furthest away from the buoy 15, as the platform 1 has turned 180 degrees. The export cable 14 is now stretched similar to almost the whole distance of the platform 1. The slack that was previously near the sea floor 17 is now raised to a much higher position, as well as the buoy 15 being pulled nearer to the platform 1. A chain 36 holding the buoy can have more slack than seen on the drawing.

The two above solutions are relevant where the depth below the platform is on the higher end of the scale, as the slack both in the cable 14 as well as on the buoy 15 will be larger than in more shallow water.

Figure 10C:
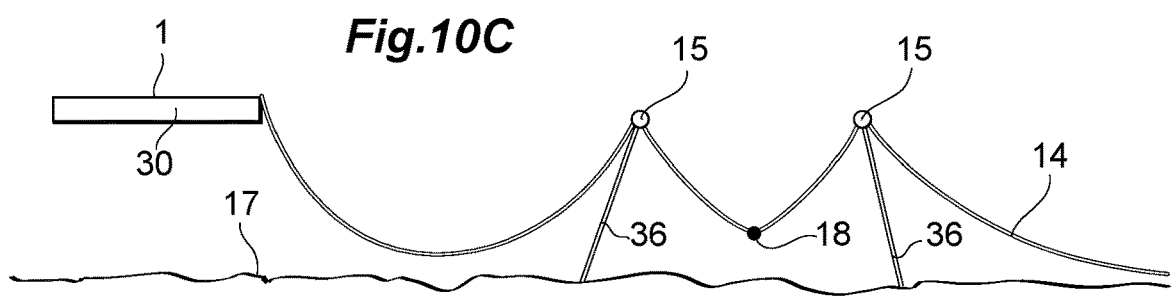

FIG. 10c shows the same principle, for more shallow water. To compensate for this the concept has one additional buoy 15. A small weight 18 is added, which has the effect of pulling the buoys 15 together and thereby adding to the total slack available in the cable 14.

Figure 10D:
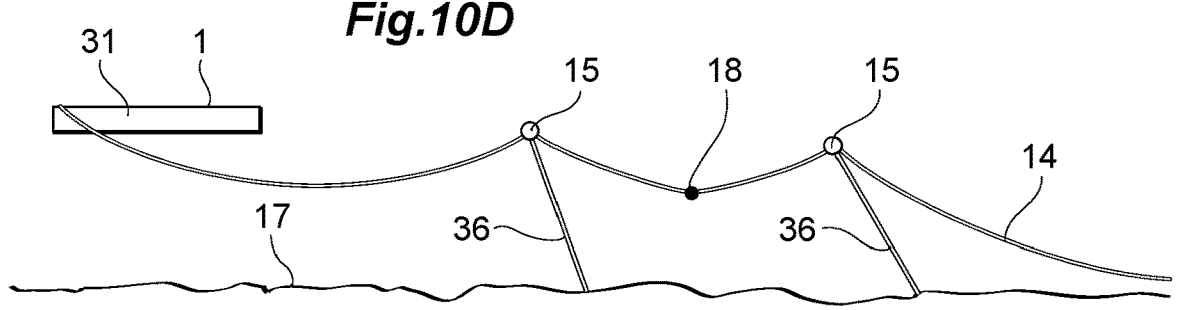

FIG. 10d shows the platform 1 turned with the end 32 having the rail 11 furthest away from the buoys 15, and consequently at maximum stretch. Due to the extra slack provided by the two buoys 15 and to weight 18, which is now raised, the total length of the slack relative to sea depth is almost doubled.

FIG. 11a, b shows the concept of outriggers 37 when the platform 1 is long and narrow. FIG. 11a is birds view and Fig. lib side view from the short side 33. The design with ratio up to 10:1 length of the long sides 30, 31 versus the width between the long sides is optimal when wanting to extract large amounts of energy even in smaller waves. For instance, with average wave height 1.8 meters which is typical in large areas of the North Sea, the wavelength will be 40 meters. With a 100×10 meters, the distance front 30 to back 31 is 10 meters, will fit well into this shorter wave length. A suitable ration between width of the platform and wavelength is between 1 to 4 and 1 to 5. When referring to width of the platform in this text, it means the shorter side, the length is the longest side. Wavelength is from crest to crest. The lifting area will be sufficient to match the daily power output of the largest wind power units in the same area, at a lower cost.

A wave height of about 3 meters gives a wavelength of about 60 meters in fully developed sea, and a wave height of about 5 meters gives a wavelength of about 90 meters.

As the platform 1 needs a certain height versus width and length to have its strength, this long and narrow design will be more unstable than the previous shown 3.5:1 ratio. Therefore, the outrigger 37 could be added to make sure it does not lean too much or tip over. The platform 1 will have the power take-off/machinery 27 plus ballast tanks 20 low in the body 24, making a positive impact on stability. This, combined with a more inclination of the front 30 and back 31, providing a V-shape of the body 24, will most likely do sufficient to keep it upright, but outriggers could be an additional option to increase stability.

The outriggers 37 are of such moderate size that they will only slightly decrease the distance the platform 1 sinks down in the wave trough, so that the performance is just very slightly negatively affected. On stability though, this slight lift is plenty to keep the plat-form 1 stable. As can be seen in Fig. lib, the lower side of the outriggers 37, are provided higher up than the underside 28 of the platform 1. In this way, the outriggers 37 will for most of the time, remain out of water, or just slightly touching when needed. An outrigger 37 may have any suitable shape.

Even if FIG. 11a, b shows the platform with one outrigger 37 on each side, two or more w could be an option, the principle of stabilizing the platform 1 remains the same. However, since the force towards the point absorber points downwards, it would be most logical to place the outrigger 37 in the same area, as the force is opposite. In this way, less material is needed for strength. If one point absorber connection 25b is in the middle, this would be the logical area for the outrigger 37. Like ways, if more than one connection, such as 25b, is relevant, one would consider more than one area for placement of the outriggers 37.

In FIG. 12a, b an embodiment of the floating platform is shown comprising more than one machinery 27, in the shown example three, which are connected via a power extraction connection 25b', 25b", 25b''' each to a structure 41, which in turn is connected via the power extraction connection 25b to the mooring 25. This is a conceivable option of extracting the power when the length versus width of the platform 1 exceeds about 5:1. In dividing the load on the platform on three different areas, the bending forces on the construction will be more evenly spread. As a consequence, less strengthening material needs to be used, making a lighter and less costly platform 1 construction. Another aspect is that with for instance 2000 square meters of lifting area, the demand on strength and sizing of a single power take-off system might be a challenge to design, so that dividing on three points might be more desirable.

Figure 12B:
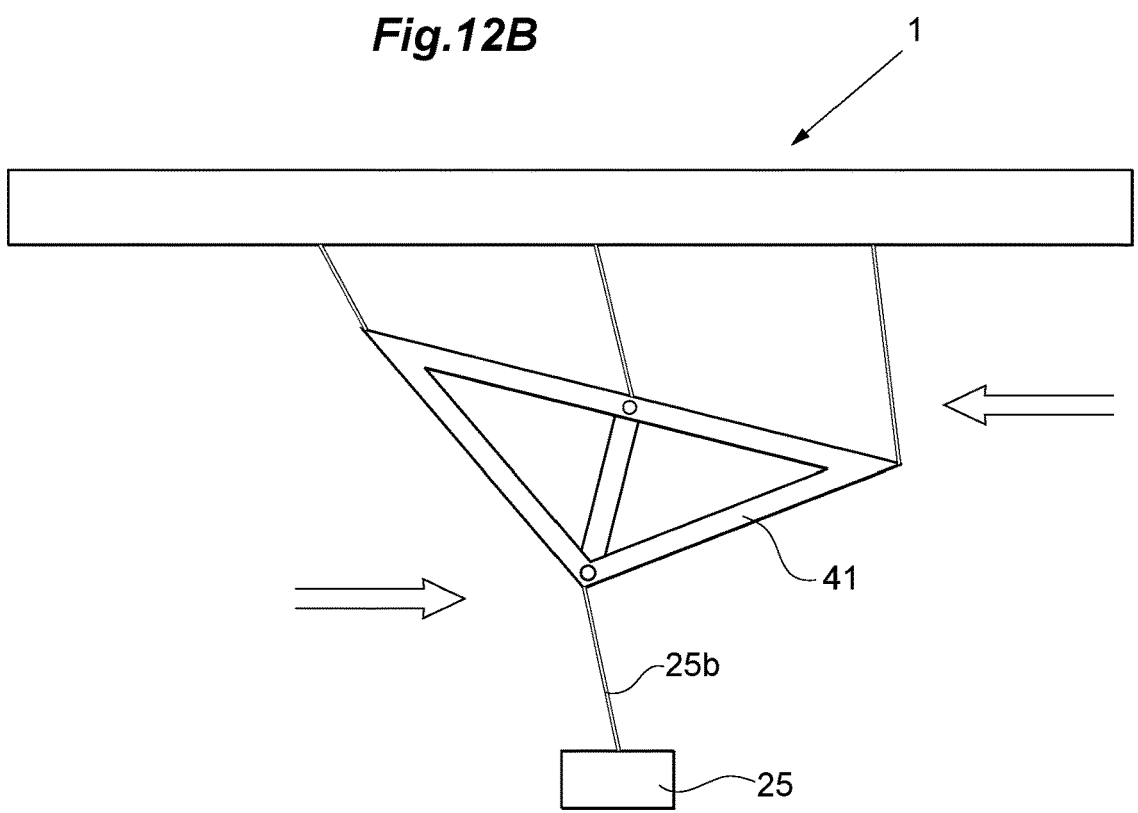

FIG. 12a shows a structure 41 in a horizontal position. The structure 41 is made to make the platform swivel around one mooring 25. The construction of the structure 41 is preferred for two reasons. Firstly, it will be much stronger than a straight bar. Secondly, it will exert a balancing force between the three points, as any dislocation, see FIG. 12b, out of the horizontal plane will force both the bottom and top part of the structure 41, in to-wards the position shown in FIG. 12a. The balancing effect may be further enhanced by electronical and/or mechanical measuring systems, combined with a controlling unit (not shown).

The platform 1 can be constructed of steel, aluminium, sandwich composites, PVC, EPS/XPS or other materials. Preferably the platform is constructed in a similar way as some modern catamarans using polymer sandwich composite materials to keep the platform 1 floating as w much as possible on the waves 6 without going to deep in the water. Preferably the platform will only protrude about 2 decimetres deep into the water.

The platform 1 will be constructed to be able to withstand the strongest of winds and highest of waves, even laying parallel to the waves. As the skilled person in the technical area knows, waves may reach heights of 30 meters. This presupposes that it is placed in deep enough water, so as to avoid breaking waves, normally based on a minimum of 1.3 times the maximum probable wave height. As the platform 1 has such a large area as well as being light in relation to its size, it will basically float on top of the water, depending on the power extraction. This has a consequence that the survivability compared to a normally heavy, low floating WEC, is on a different scale. It will behave much like a floating pontoon, where the horizontal surge motion of the wave, will have much less force on the unit, than on a deeper laying concept. This even if the total frontal area of the platform is larger.

The present invention provides a solution that in one unit will make it possible to harness power equal to or more than the world's largest offshore wind power units. These wind turbines have a tower height of more than 100 meters requiring costly installation in deep water, as well with blades having a diameter of 160 meters plus, making them a visual dis-turbance. The present invention will cost approximately 50-70 percent of offshore wind power plants, production and installation included, per produced MW, in average. The visual disturbance will be minimal, with 5-10 percent of the height as well as making moderate noise. It can also be placed closer to shore as long as the depth is more than 1.3 times the highest probable monster wave in the relevant area. The reason is that breaking waves, which is a danger to floating devices, will be avoided, as the waves will have deep sea shape. In practical life 30-50 meter depths will be sufficient.

It is a well-known fact that many wave power concepts have had their moorings ripped off in heavy seas, and that this survival aspect is a major concern and challenge. The explanation lays in the fact that waves are orbital in motion, the horizontal force is about equal to the vertical motion. A common type WEC lays deep in the water and actually has a larger side area than vertical area. This means that if the peak lifting force for instance comes to 1 MN, you might have a horizontal force of more than 3 MN, three times that number, explaining why they break. A common shape would be 8 meter diameter × 10 meter deep giving 80 square meters times 0.5 drag coefficient creating a drag area corresponding to 40 square meters of drag area with 1.0 coefficient. A 50×11-meter light Floating Platform with 0.82 in drag coefficient but laying only 20 cm deep in water, will create a drag area corresponding to 8.2 square meters of drag 1.0 coefficient. The latest numbers, without damping applied for power extraction, shows that the force applied on the moorings and attachments will be 1/5 of the standard concept with large draft, showing that the survival chances in high waves/monster waves are much better. The 1/5 lateral force is in addition with more than ten times the lifting area, showing the tremendous advantage of 50-1 when it comes to lifting force versus survival ability.

Calculations done by WavEC, Portugal, have shown the advantage for the proposed light Platform, to be better than 12-1 even when comparing power output under full production when the damping holds the platform deeper in water, compared to the usual circular deep floating shapes. When winds exceed 40-50 knots, the risk for monster waves arise. In this case, the PTO damping may be reduced to half or zero, giving the above low numbers for strain on the moorings, thereby having a strategy for survival, not possible for other lower laying concepts. All in all, it acts like a surf board/pontoon in heavy seas.

As the vertical speed of the waves can exceed 3 meters per second, the normal heavy resonant WEC's will get even lower in the water due to inertia, exposing it even more horizontal surge strain on the moorings. A light high floating concept like the Floating Platform, will react immediately upon the rapidly rising wave, keeping the exposed area under water almost similar, thereby not increasing the horizontal force, thereby bettering the chances for survival by a large margin.

Given that it is so much lower in height than offshore wind power concepts, it can be placed quite near to shore without disturbing the visual scenery. Often wind power is placed 20-60 km offshore, making installation, cables and maintenance a costly concept.

This specific patent is for the floating platform/absorber design. The power output is based on the machinery, which can be of any known or future type.

All different embodiments may be combined with one or more of the different parts and portions shown and described, making up several more embodiments than shown in this description, as long as it is not contradictory in accordance with the claims.

The invention claimed is:

1. A floating platform for a wave energy converter (WEC) of point absorber type, comprising a hollow body, and energy converting machinery positioned in or partially hanging underneath the floating platform, wherein the floating platform has an underside facing the water in use, an upper side facing an opposite direction and a first long-side forming a front and a second long-side forming a back, and two short-sides, wherein the floating platform comprises at least one aligning means, the aligning means being configured to align the front of the floating platform with a wave front, perpendicular to the direction of a wave, wherein the front of the floating platform has a length of at least 30 m and at least two times the length of the short-sides, wherein the floating platform has a height of at least 1 m, and wherein the floating platform is configured to be anchored to a sea bottom with at least one anchoring means between the sea bottom and the floating platform, and wherein the platform further comprises at least one power extraction connection member arranged to connect the energy converting machinery to a mooring at the sea bottom, such that vertical wave forces acting on the floating platform can be converted by the energy converting machinery to generate electricity.

2. The floating platform according to claim 1, wherein the length of the front is at least 30 m, preferably at least 40 m, and most preferred at least 50 m.

3. The floating platform according to claim 1, wherein the length of the front is at least three times the length of the short-sides, preferably at least five times the length of the short-sides.

4. The floating platform according to claim 1, wherein the height of the floating platform is at least 2 m, preferably at least 4 m.

5. The floating platform according to claim 1, wherein the aligning means are any one of or combination of wing(s) provided at least on the upper side, jet thruster(s) arranged in vicinity of the underside, blades arranged in vicinity of the short sides, and/or propeller(s) arranged in the vicinity of the underside.

6. The floating platform according to claim 5, wherein the wing(s) are arranged so that they start halfway between the front and the back and reach out backwards behind the back.

7. The floating platform according to claim 5, wherein there are at least two wings, and preferably at least four wings.

8. The floating platform according to claim 7, wherein the wings are almost parallel having an angle between 0 and 8 degrees spreading out backwards.

9. The floating platform according to claim 5, wherein at least two jet thrusters are configured to thrust water backwards and frontwards, respectively, in the vicinity of one short-side.

10. The floating platform according to claim 5, wherein the wings are mounted on a vertical swivel axis and arranged to be turned ±30-40 degrees.

11. The floating platform according to claim 1, wherein the short-sides have at least a first portion provided in an angle greater than 90 degrees between the front and the first portion.

12. The floating platform according to claim 1, wherein the floating platform is constructed of steel, aluminum, sandwich composites, PVC and/or EPS/XPS.

13. The floating platform according to claim 1, wherein the anchoring means are arranged to anchor the floating platform in a relative fixed position to limit rotation and align the floating platform with the wave front.

14. The floating platform according to claim 1, further comprising a rotatable attachment means provided at the underside of the floating platform for attaching the anchoring means.

15. The floating platform according to claim 14, wherein the at least one power extraction connection is arranged to pass through the rotatable attachment means, into the floating platform.

16. The floating platform according to claim 14, wherein the rotatable attachment means comprises an outer ring arranged to glide freely around an inner ring, which is fastened to the underside of the floating platform.

17. The floating platform according to claim 16, wherein the rings are larger than the length of the short-sides of the floating platform.

\* \* \* \* \*